Patented Apr. 3, 1934

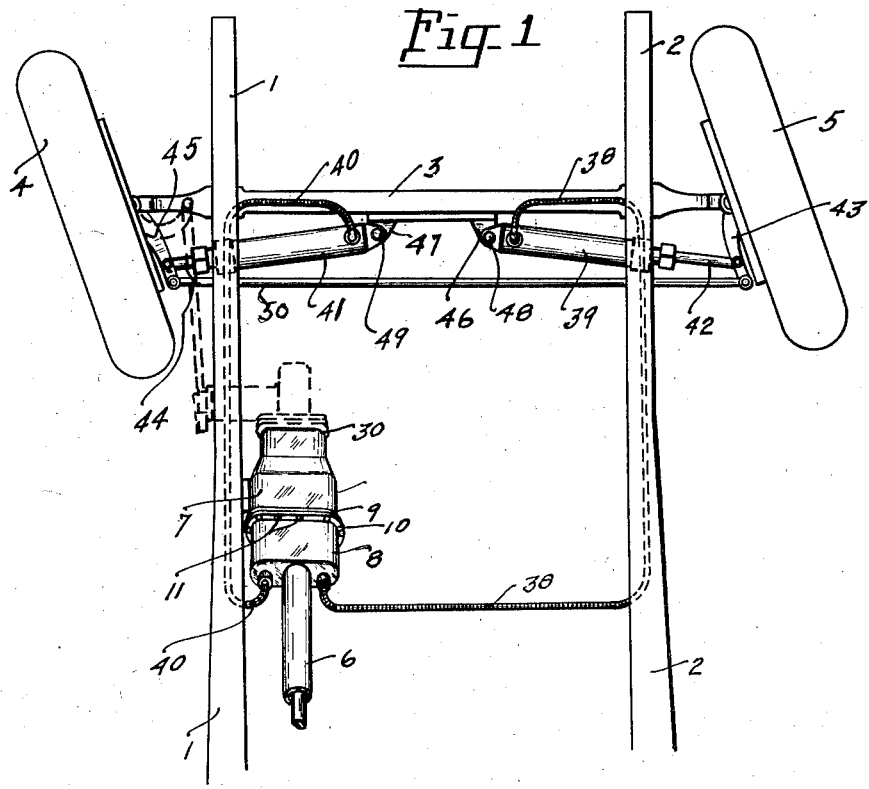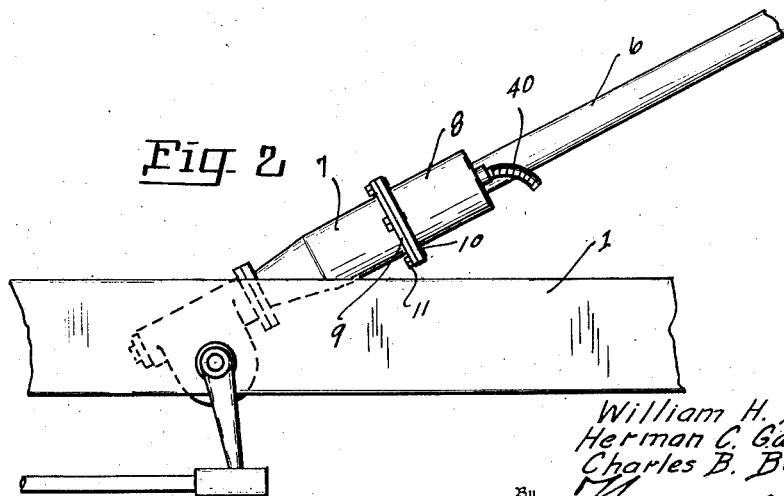

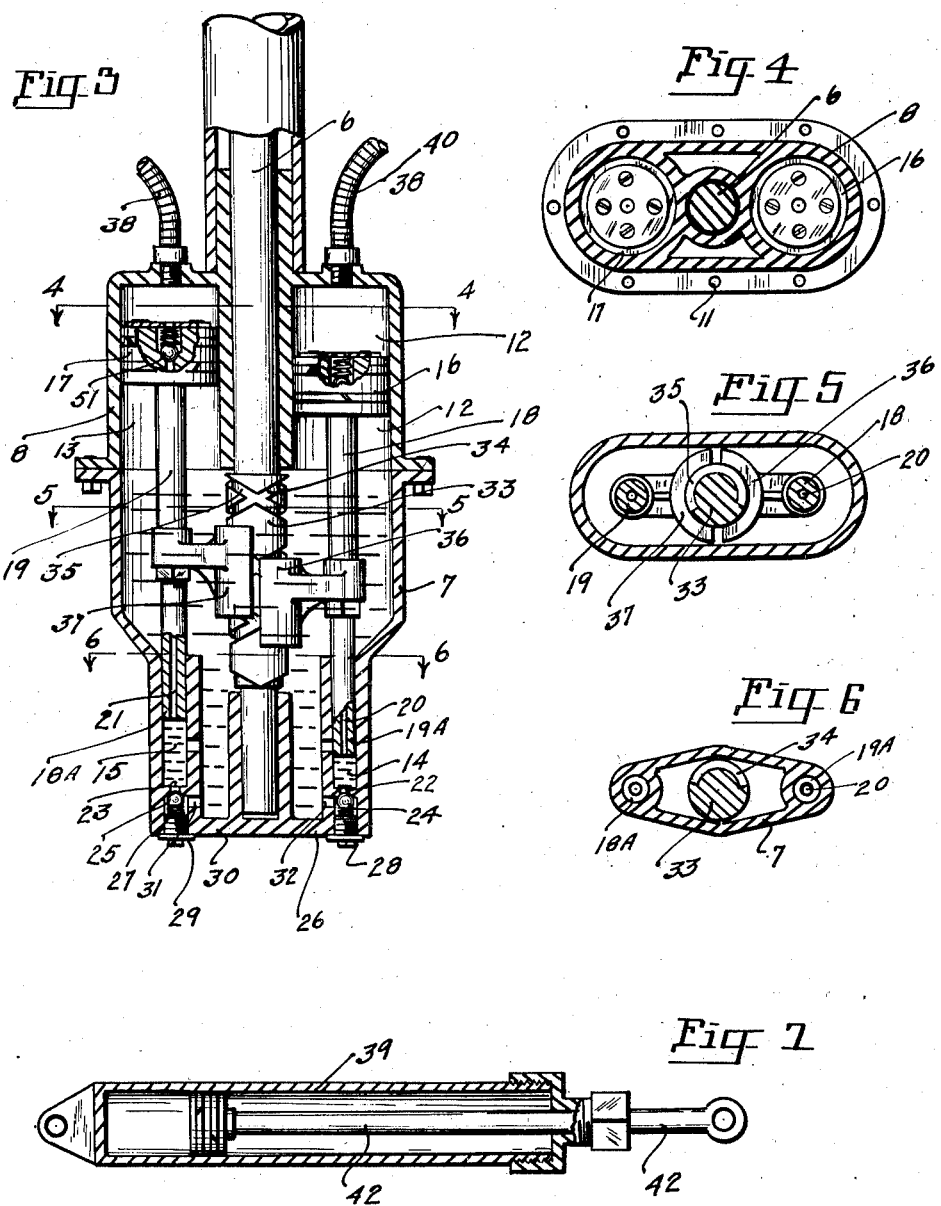

1,953,742

UNITED STATES PATENT OFFICE 1,953,742

HYDRAULIC STEERING MECHANISM

William H. Bunch and Herman C. Gaertner, La Grande, and Charles B. Bunch, Adams, Oreg.

Application November 19, 1932, Serial No. 643,462

2 Claims. (Cl. 280—87)

Our invention relates to hydraulic steering mechanisms employing fluid pressure operating means for being controlled and regulated by the operator to perform the work of turning the front steering wheels of motor vehicles.

The device may be used for steering purposes for controlling the rudder of a water craft.

The invention is comprised primarily of a pair of cylinders hingedly secured to the front axle, or to the chassis of the motor vehicle with pistons leading therefrom that connect with the steering arm of the steering wheels, or front wheels of the vehicle.

A fluid holding reservoir is associated with the steering column of the vehicle. Pairs of open ended cylinders are disposed within the liquid holding reservoir, with pistons reciprocably disposed within each of the cylinders. The pair of pistons disposed at either side of the liquid holding reservoir have a common piston rod, and the piston rod and the pistons are adapted for being reciprocated through the action of a double threaded actuator that is associated with the lower end of the steering column of the vehicle to thereby pump the operating fluid from the fluid holding reservoir to the cylinders associated with the steering wheels of the vehicle. The piston rods are hollow to adapt the same for having the operating fluid pumped longitudinally thereof; the object of which is to maintain the operating fluid under pressure that is disposed in the reservoir and in the circuit filled with the operating fluid.

One of the objects of our invention consists in providing hydraulic steering for motor vehicles.

A further object of our invention consists in providing hydraulic means for the steering of vehicles that will maintain the steering mechanism free from slack and that will maintain the steering mechanism in a tight working relationship to thereby prevent the shimmying of the steering wheels.

And a still further object of our invention consists in so constructing my device that it will be comprised of relatively few simply constructed parts and one that will have a long and useful operating life and that will be practically free from mechanical operating annoyances.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a fragmentary, top, plan view of the chassis of the motor vehicle illustrating our device installed thereupon and connected to the steering column and to the steering wheels of the vehicle.

Fig. 2 is a fragmentary, side view, of the mechanism illustrated in Fig. 1.

Fig. 3 is a longitudinal, sectional, side view of the fluid holding reservoir assembly.

Fig. 4 is a sectional, end view of the mechanism illustrated in Fig. 3. This view is taken on line 4—4 of Fig. 3, looking in the direction indicated.

Fig. 5 is a sectional, end view, of the mechanism illustrated in Fig. 3. This view is taken on line 5—5 of Fig. 3, looking in the direction indicated.

Fig. 6 is a sectional, end view of the mechanism illustrated in Fig. 3. This view is taken on line 6—6 of Fig. 3, looking in the direction indicated.

Fig. 7 is a sectional, side view of the steering cylinder and piston assembly that is directly secured to the steering arm of the steering wheels of the vehicle.

Like reference characters refer to like parts throughout the several views.

1 and 2 comprise the side frames of the motor vehicle. 3 is the front axle. 4 and 5 are the front, or steering wheels of the vehicle. The steering column is illustrated at 6.

We provide a fluid holding reservoir, as illustrated in longitudinal, sectional, view, in Fig. 3. This reservoir is comprised of separable sections, as illustrated at 7 and 8. Companion flanges, as illustrated at 9 and 10 are associated with the meeting ends of the oppositely disposed ends of the reservoir. The flanges are used to facilitate the securing of the two end sections together. Fastening bolts 11 are used as the fastening means. A pair of open ended cylinders 12 and 13 are disposed in the end section 8 and a pair of relatively small open ended cylinders 14 and 15 are disposed in the end section 7 of the fluid holding reservoir. The cylinders 12 and 14 have a common center line. The cylinders 8 and 15 have a common center line. A piston 16 is disposed within the cylinder 12 and a piston 17 is disposed within the cylinder 8. Piston rods 18 and 19 are associated with the pistons 16 and 17. The ends 18A and 19A of the piston rods 18 and 19 form pistons when disposed within the cylinders 14 and 15. Each of the piston rods have passageways 20 and 21 running longitudinally thereof. Ports 22 and 23 are disposed within the ends of the cylinders 14 and 15 and ball closing valves 24 and 25 are adapted for being normally maintained seated through the action of reacting elements as coil springs 26 and 27.

The seating pressure of the springs is adapted for being adjusted through the action of threaded supports 28 and 29. The threaded supports are threadably secured to the head 30 of the end section 7. Ports 31 and 32 communicate through the cylinder walls to the interior or the fluid holding reservoir. The steering column 6 is journaled within the respective end sections 7 and 8 of the fluid holding reservoir.

A double threaded actuator 33 is disposed upon the steering column 6 and as the column is rotated the block 33 is rotated. Right and left hand screw threads 34 and 35 are disposed upon the outer periphery of the actuating control block 33. Coacting shoes 36 and 37 coact with the control block 33 and with each other and are adapted for being moved longitudinally of the actuating control block by the threaded connection disposed between the shoes and the actuating control block.

The shoe 36 is secured to the piston rod 18 and the shoe 37 is secured to the piston rod 19 and the piston assembly associated with the piston rods are moved directly as the shoes are moved.

As the steering column is rotated in one direction by the operator the respective shoes and piston assembly, adapted for being manipulated thereby, are moved in opposite direction. A flexible pipe 38 leads from the cylinder 12 to the steering cylinder 39 and the flexible pipe 40, leads from the cylinder 13 to the steering cylinder 41. Pistons are disposed within the respective steering cylinders 39 and 41, as illustrated in Fig. 7. The piston rod 42 is connected to the steering arm 43, and the piston rod 44 is connected to the steering arm 45. Each of the steering cylinders are rockably secured to a fixed support, as illustrated in Fig. 1, as by being rockably connected to the brackets 46 and 47. The cylinders are secured thereto by any suitable journal supports 48 and 49 respectively.

A connecting rod 50 maintains a proper spaced relationship between the steering arms 43 and 44, at all times. As the pistons 16 and 17 are reciprocated within their respective cylinders 12 and 13 the operating fluid will be shunted simultaneously into and out of the steering cylinders 39 and 41, to thereby impart movement to the respective front steering wheels 4 and 5.

In a device of this type it is highly essential that the operating fluid be maintained under a constant pressure at all times disposed within the outlet ends of the cylinders 12 and 13 and in the pipes 38 and 40 and in the steering cylinders 39 and 41. We accomplish this by and through the action of the pistons 18A and 19A operating within the cylinders 14 and 15. These pistons pump the fluid trapped within the cylinders 14 and 15 longitudinally of the piston rods through the openings 20 and 21 and against check valves 51 and 52 that are disposed within the respective pistons 16 and 17. This automatically maintains the fluid disposed within the steering cylinders and the connections leading thereto under substantially higher pressure than the fluid disposed within the reservoir. Since the diameters of the pistons 18A and 19A are substantially smaller than the diameters of the pistons 16 and 17, the fluid pumped from the cylinders of smaller diameters to the cylinders of larger diameters is delivered at a pressure higher than that existing within the steering cylinder.

When the steering wheel is rotated in either direction the pistons 16 and 17 and their respective piston rods move in opposite directions with respect to each other. In other words, as one piston travels downwardly in its cylinder, the other piston travels upwardly. The suction created by the downwardly moving piston in its cylinder draws the fluid out of the steering cylinder to which that cylinder is connected. At the same time the upwardly moving piston forces the fluid within its cylinder to the opposite steering cylinder through the pipe connection therebetween.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What we claim is:

1. In a vehicle having a front axle and steering wheels pivotally mounted to the ends thereof and a steering column pivotally mounted within the chassis of the vehicle and operatively interconnected with said steering wheels, the combination of a pair of steering cylinders operatively engaged with said wheels and pivotally mounted to said axle, a reservoir mounted to the chassis of the vehicle, said reservoir comprising a housing formed at its upper and lower ends with pairs of cylinders, said lower cylinders being of smaller diameter than the upper cylinders, pistons slidably mounted within said upper cylinders and connecting rods depending therefrom, the lowermost ends of said piston rods forming pistons within the lower cylinders, said pistons and piston rods being longitudinally bored from end to end to form a passageway between their respective cylinders whereby any leakage between said upper pistons and said steering cylinders will be compensated for by the fluid passing from said lower cylinders through said piston rods into the upper cylinders, a pipe connection between said upper cylinders and said steering cylinders and means within said reservoir for reciprocating the pistons upon rotation of said steering column.

2. A vehicle having a front axle and steering wheels pivotally mounted to the ends thereof and a steering column pivotally mounted within the chassis of the vehicle and operatively interconnected with said steering wheels, the combination of a pair of steering cylinders operatively engaged with said wheels and pivotally mounted to said axle, a reservoir mounted to the chassis of the vehicle, cylinders formed above and below said reservoir, pistons slidably mounted within the uppermost cylinders thereof and having piston rods depending therefrom and forming pistons within the lower cylinders, said pistons and piston rods being internally bored throughout their length to form a fluid passageway therethrough, a check valve provided in each of said upper pistons to permit passage of fluid therethrough in one direction, said pistons adapted to be reciprocated with respect to each other upon rotation of said steering column, pipe connections between said upper cylinders and said steering cylinders whereby reciprocation of said pistons will cause said steering cylinders to be actuated.

WILLIAM H. BUNCH.
HERMAN C. GAERTNER.
CHARLES B. BUNCH.